2 Sheets—Sheet 1.

H. G. FISKE.
Lawn Mower.

No. 234,553. Patented Nov. 16, 1880.

Witnesses;
George M. Fiske.
Arthur H. Fay.

Inventor;
Henry G. Fiske

2 Sheets—Sheet 2.
H. G. FISKE.
Lawn Mower.
No. 234,553. Patented Nov. 16, 1880.
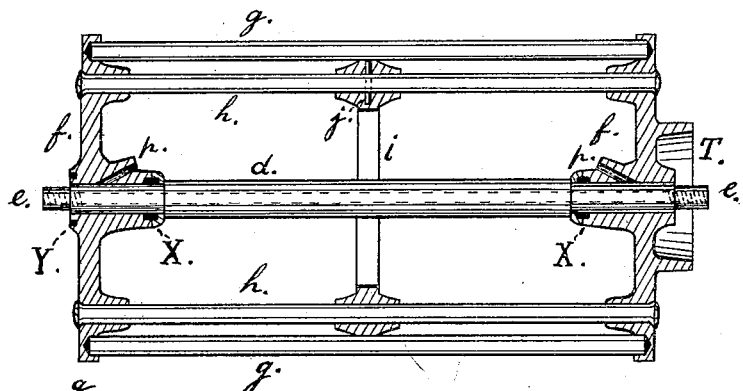
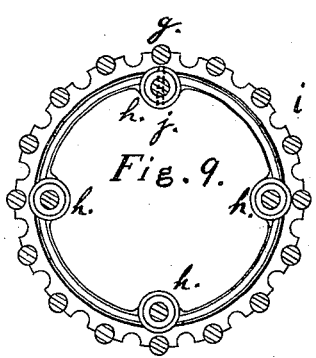
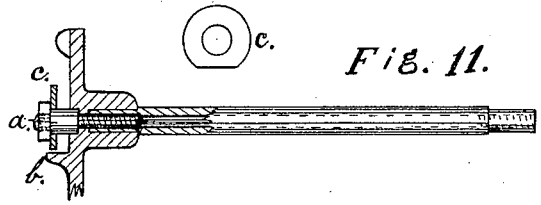
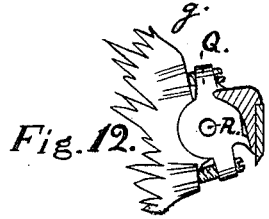
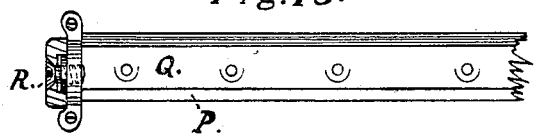
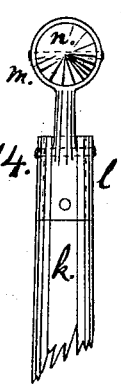
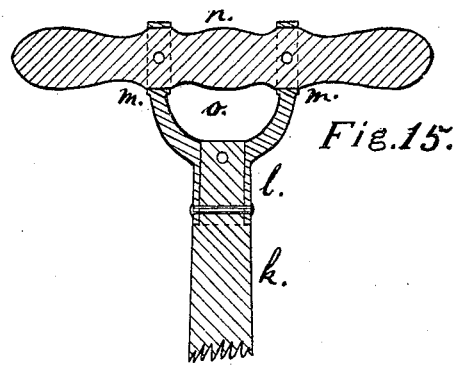
Witnesses; Inventor;
George M. Fiske Henry G. Fiske
Arthur H. Fay

UNITED STATES PATENT OFFICE.

HENRY G. FISKE, OF SPRINGFIELD, MASSACHUSETTS.

LAWN-MOWER.

SPECIFICATION forming part of Letters Patent No. 234,553, dated November 16, 1880.

Application filed February 21, 1880.

*To all whom it may concern:*

Be it known that I, HENRY G. FISKE, of Springfield, in the county of Hampden and State of Massachusetts, have invented a new and useful Improvement in Lawn-Mowers, which improvement is fully set forth in the following specification and accompanying drawings.

My invention relates to a machine for cutting grass upon lawns, and embodies certain improvements on the machine patented by me October 7, 1879, No. 220,226, and its object is to make the actuating-roller stronger and lighter, to make the sliding handle take a firm hold when the cutting apparatus is tilted upward, and to provide a means of firmly securing the adjustable truck-wheels so that they may hinge upon the same center as the cutting-cylinder and save space and weight of the mower.

The nature of my invention consists, first, in constructing the actuating-roller of a lawn-mower of rods or wires inserted at their ends into a flange, one at each end, and there secured by suitable bolts or rivets, thus securing the flanges together, and, of course, holding the wires in place without the aid of a central shaft, and enabling the center of each flange to become the axis of the roller; second, it consists in providing the wires of the aforesaid roller with one or more central supports when the roller is of such length as to make the wires to become too flexible; third, it consists in making the lower portion of the handle, where it joins the mower, of such hooking shape as to enable it to retain a firm hold of the mower when drawn backward and the cutting apparatus is tilted upward; and, fourth, it consists in the arrangement of the truck-wheels to economize space, all of which will be more fully hereinafter described.

Figure 1:
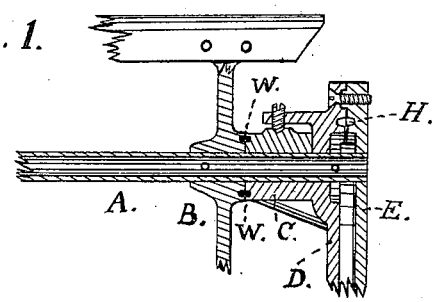
Figure 2:
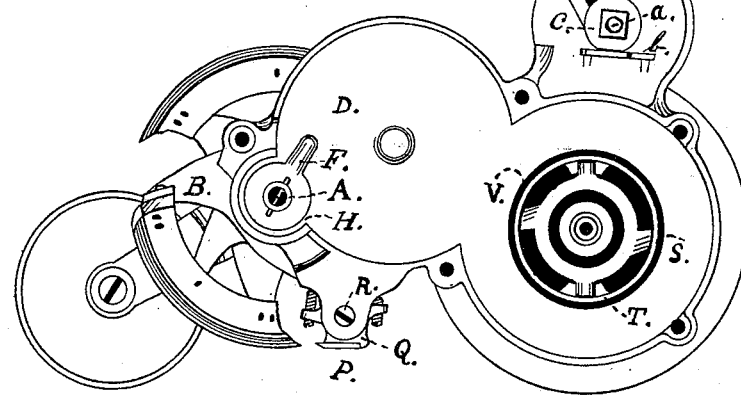
Figure 3:
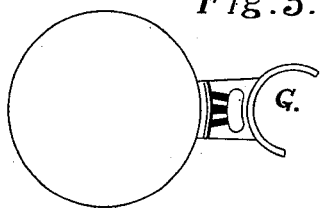
Figure 4:
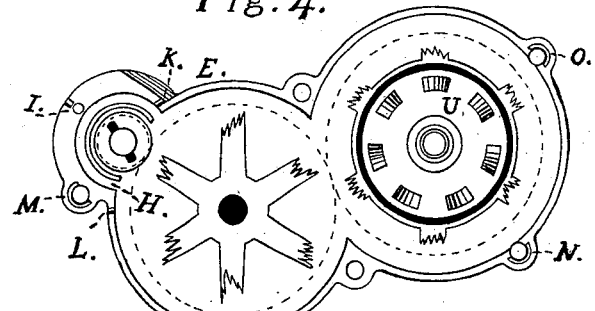
Figure 5:
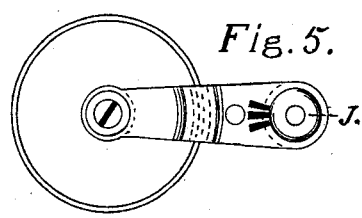
Figures 6, 7:
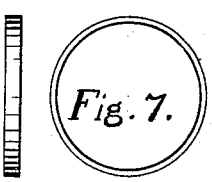

Figure 1 is a longitudinal section view of a portion of the revolving cutter-shaft, one of its journal-boxes, and of the gear-case. Fig. 2 is a side elevation of a lawn-mower having the gears, one of the truck-wheels, and the cap of the gear-case removed, showing a part of my invention applied. Fig. 3 is an end elevation of the truck-wheel with its holder or arm, which fits into the gear-case. Fig. 4 is an inside view of the cap to the gear-case, and shows sections of the gears and their pitch-diameter and the manner of fastening the small gear to the cutter-shaft, and also the manner of securing the arm of the truck-wheel, Fig. 3, within the gear-case. Fig. 5 is a second truck-wheel with its securing-arm, and is arranged to secure at the end opposite to Fig. 3. Figs. 6 and 7 are a side and a front elevation, respectively, of the protecting-band which covers the exposed journals, and is to keep the oil in and dirt, &c., out. Fig. 8 is a longitudinal section of the actuating-roller mounted on the tubular brace, upon which it is arranged to revolve, and shows the manner of securing the rods to the heads and center supporting-ring. (Only two of the rods which are arranged at regular intervals around its periphery are shown in the drawings to avoid complexity.) This figure also shows the arrangement of the oil-holes and the manner of inserting the protecting-rings shown in Figs. 6 and 7. Fig. 9 is a transverse section of the central portion of the roller, and shows the manner of arranging the central supporting-ring. Fig. 10 is a plan view of the washer employed on the pivot upon which the handle swings. Fig. 11 is a longitudinal section of a portion of one of the ends of the frame to the lawn-mower, and shows the manner of securing the tubular brace and the arrangement of the washer shown in Fig. 10. Fig. 12 is an inside transverse section view of the frame and cutter-bar, and shows the manner of securing and adjusting the cutter-bar on the frame. Fig. 13 is a plan view of Fig. 12, except that only that portion of the frame beneath the binding-screw which binds the cutter-bar to said frame is shown, and this view shows the manner of securing the cutter-bar to the frame. Fig. 14 is an end elevation of the upper portion of the handle, and Fig. 15 is a longitudinal section of the same.

Similar letters refer to similar parts throughout the several views.

As represented in the drawings, A is a tubular shaft, to which the cutter-head B is secured, and passes through the journal C, thence into and through the gear-case D and its cap E. D is depressed where A emerges through it, to permit an increased depth of space at this point, between it and the cap E, to allow of an increase in thickness of the small gear, that it may be slipped on and off of a pin which secures it to A.

To enable the securing-pin to be put in and taken out of A, the groove F is cast into D, and the revolving cutters have ample space to revolve around it. It avoids an increased thickness of the case D, and also avoids an increase of weight.

The circular arm G is arranged to swing around the same center as the cutter-shaft A, and is adapted to fit in the circular groove H and to be secured to E at I with the aid of a binding-screw and a stud and rack. By having the arm G thus fitted in the groove H and inclosed within the gear-case it requires but one screw to hold it firmly in its place, and also avoids increasing the width of the frame. The arm shown in Fig. 5 is similarly secured to the opposite end of the mower, except that the cup-shaped end J is secured with a screw to a hub projecting on the end of the frame.

To enable me to obtain a sufficient depth of thread at I, I increase the thickness of E from K around to L and decrease the thickness of the case D to correspond at this point, but allow the remainder of E to be considerably thinner, that the several binding-screws which secure it to D may straighten out any inequalities in the casting and bring it down to fit close to D.

At M N O, on E, will be seen projections partly surrounding the screw-holes. These fit corresponding recesses in the case D. Their office is to make the cap E always fit in its proper place when secured to D, and they are arranged at these points that they may be machined when the holes are being drilled, to avoid a special operation, and also further increase the weight of the casting by locating elsewhere.

The office of the truck-wheels, Figs. 3 and 5, as will be seen, is to regulate the height of the cutting apparatus, of which P is the lower or straight knife, and is secured to the cutter-bar Q. This in turn is secured to the frame at each end with the screw R, which is sunk into the outside of the frame, then screws into the end of cutter-bar, the latter being elongated at these points and fitted into the frame at each end, thus forming an axis upon which it may turn while adjusting with its adjusting-screws.

The dark circle V, (shown in Fig. 2,) surrounding the end of the roller in the gear-case D, also the dark circle on the ratchet-gear U of Fig. 4, each represent a recess for the insertion of the band, Figs. 6 and 7, the object of this band being to cover up the opening between the gear-case and the end of the roller and keep grass, dirt, &c., out of the gears and their bearings. A similar band or packing is seen at W, Fig. 1, and X X, Fig. 8, and a space, Y, is shown for one in the same figure. These bands are preferably made of a flexible material, but will answer very well if made rigid. The bands or packing are not intended to act like a loose collar with which to separate the bearings, but to cover or pack its outward opening, and they may turn loosely or otherwise.

The handle-iron Z is bent in the form of a hook to enable it to take a better hold on the pivot $a$ and the projection $b$, when the handle is swung forward and pushed backward to its place, to tilt the cutting apparatus upward for protection while moving the mower from place to place. Now, when the handle-iron Z is made straight at the point just above where it is hinged to and slides on the pivot $a$ and projection $b$, and it is slid down into place and the cutting apparatus tilted upward, when the mower is being drawn backward the handle-iron Z is very apt to slide back off of the projection $b$ and let the cutting apparatus drop down, all of which I prevent by making the handle-iron hooking, as above described. The projection $b$, I arrange in such a position that the mower is tilted just enough for use to cut off the tops of high grass.

The tubular brace $d$ is secured to each end of the frame at $e$ $e$. The heads $f$ $f$ are fitted loosely, one on each end of $d$, and a series of rods similar to $g$ $g$ are arranged around their periphery and rest against them in suitable holes, and are there firmly secured by means of the bolts or rivets $h$, of which there may be any desirable number, and which may be riveted down upon the heads $f$ firmly, or may be secured with a screw-threaded bolt and nut. The object in making them in this way is to avoid the employment of an expensive tube, which has to be fitted to, or at least slipped over, the brace $d$. By bolting the roller together, as shown, it is made very much stronger, and lighter also; and this feature is especially desirable, as the lighter a mower can be made and do its work well the easier it will run.

The ring or support $i$ is employed in the actuating-roller, when it is of a considerable length, to support the rods and assist in retaining them in place. The bolts also pass through it, and by so doing they assist in giving the roller greater rigidity. This ring may be pinned at one or more of the bolts, as at $j$, and the ring may also be extended inward and rest on the brace $d$, if desired.

To protect the oil-holes and keep the dirt out, I cast a lug on the parts where they are to be made, having its front edge inclined nearly perpendicular, and then drill the hole in this face at a very slight angle into the box or bearing, as shown at $p$ $p$, thus preventing any direct entrance of dirt, &c.

Having thus described my invention, what I claim as new, and desire to secure by Letters Patent, is—

1. In the actuating-roller of a lawn-mower, the combination of the heads $f$ $f$, when provided with the rods $g$ and secured with rods $h$, substantially as herein shown and described.

2. In the actuating-roller of a lawn-mower, the support $i$, in combination with the rods $g$, when arranged for and adapted to the purposes herein substantially shown and described.

3. The handle-iron Z, adapted to slide on the pivot $a$ and projection $b$, and made of a hooking shape, to make it take a firm hold of the mower when the cutting apparatus is tilted upward and the said mower is being drawn backward, substantially as shown and described.

4. The truck-wheel of a lawn-mower, provided with the arm G, arranged to partially encircle the small gear and swing in the groove H inside of the gear-case, substantially as shown and described.

HENRY G. FISKE.

Witnesses:
ARTHUR H. FAY,
GEORGE M. FISKE.